United States Patent
Lippert et al.

(10) Patent No.: US 8,911,621 B2
(45) Date of Patent: Dec. 16, 2014

(54) FILTER SCREEN AND INTEGRATED VALVE WITH A FILTER SCREEN

(75) Inventors: Lorenz Lippert, Gemuenden (DE); Juergen Rettinger, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 1135 days.

(21) Appl. No.: 12/921,469

(22) PCT Filed: Feb. 7, 2009

(86) PCT No.: PCT/EP2009/000862
§ 371 (c)(1),
(2), (4) Date: Oct. 7, 2010

(87) PCT Pub. No.: WO2009/112131
PCT Pub. Date: Sep. 17, 2009

(65) Prior Publication Data
US 2011/0011783 A1    Jan. 20, 2011

(30) Foreign Application Priority Data
Mar. 8, 2008   (DE) .......... 10 2008 013 270

(51) Int. Cl.
| B01D 35/02 | (2006.01) |
| B01D 29/15 | (2006.01) |
| F16K 31/06 | (2006.01) |
| F16K 31/02 | (2006.01) |
| F16K 51/00 | (2006.01) |

(52) U.S. Cl.
CPC ......... *F16K 31/0613* (2013.01); *F16K 31/0644* (2013.01); *F16K 31/0603* (2013.01)
USPC ............ 210/232; 210/432; 137/544; 137/549

(58) Field of Classification Search
USPC .......................... 210/232, 432; 137/544, 549
See application file for complete search history.

(56) References Cited

U.S. PATENT DOCUMENTS

| 4,557,902 A | 12/1985 | Mussmann |
| 5,795,038 A | 8/1998 | Fuller et al. |
| 5,836,350 A | 11/1998 | Sakaguchi et al. |
| 5,845,672 A | 12/1998 | Reuter et al. |
| 6,502,553 B2 * | 1/2003 | Banzhaf ........................ 123/458 |
| 6,659,421 B1 | 12/2003 | Goossens |
| 2002/0096465 A1 * | 7/2002 | Fritsch et al. ................. 210/233 |

FOREIGN PATENT DOCUMENTS

| DE | 19631631 A1 | 2/1997 |
| GB | 904293 A | 8/1962 |
| GB | 2098087 A | 11/1982 |
| JP | 5106756 A | 4/1993 |
| JP | 07-004555 A * | 1/1995 |
| JP | 07-151252 A * | 6/1995 |

* cited by examiner

*Primary Examiner* — Thomas M Lithgow
(74) *Attorney, Agent, or Firm* — Maginot, Moore & Beck LLP

(57) ABSTRACT

A filter screen for an integrated valve is disclosed, which is inserted into an integral bore of a housing. The filter screen has a retention protrusion, which upon insertion can be put from an assembly position into a retention position.

15 Claims, 4 Drawing Sheets

FILTER SCREEN AND INTEGRATED VALVE WITH A FILTER SCREEN

CROSS-REFERENCE TO RELATED APPLICATION

This application is a 35 USC 371 application of PCT/EP2009/000862 filed on Feb. 7, 2009.

BACKGROUND OF THE INVENTION

1. Field of the Invention

The invention relates to a filter screen and to an integrated valve assembly having a filter screen.

2. Description of the Prior Art

Such filter screens for hydraulic components are known from the LEE Company (Internet: www.theleeco.com). They relate for instance to a filter screen introduced into a flow conduit in a hydraulic arrangement. This filter screen serves to filter solid substances out of the pressure fluid, to minimize contamination. Among others, a distinction is made between filters that can be operated in two flow directions and those that can be used for only one flow direction. Such filter screens are fixed in the flow conduit via their own thread or via additional fastening means. A disadvantage of this version is first that the flow conduit must have narrow production tolerances, so that such a filter screen can be assembled, and second, that the assembly is quite complex.

OBJECT AND SUMMARY OF THE INVENTION

By comparison, the object of the invention is to create a filter screen and an integrated valve assembly having such a filter screen that can be produced economically and assembled simply.

According to the invention, a filter screen for an integrated valve is inserted into an integral bore of a housing. The filter screen has a retention protrusion, which upon introduction can be put elastically from an assembly position into a retention position. This version has the advantage that the filter screen is easy to assemble, because it is assembled together with the integrated valve and is firmly held in the integral bore. For instance, if in maintenance the integrated valve is removed from the integral bore, the filter screen remains in the integral bore, and particles that have accumulated at this filter cannot get into the integral bore. Thus work connections, for instance, that discharge into the integral bore cannot become contaminated upon maintenance of the integrated valve, so that damage to the hydraulic components connected is averted.

Advantageously, the retention protrusion has three snap-in hooks distributed uniformly over the circumference, as a result of which the filter screen can be retained in the integral bore and is simple to produce.

The snap-in hooks can extend approximately axially parallel away from a supporting ring and as a result can have very high elasticity.

One filter screen portion is preferably supported by the supporting ring and thus has a very compact structure.

Bumps that can be put into friction- or form-locking contact with an outer circumferential portion of the integrated valve can be embodied on the inner circumference of the supporting ring. Especially upon assembly of the integrated valve with the filter screen, this is advantageous, since by means of the bumps, the filter screen can be held firmly on the integrated valve and inserted simply with the integrated valve into the integral bore, and then snaps automatically into its working position.

The filter screen can be embodied in domelike fashion, and the snap-in hooks, viewed in the axial direction, and approximately in the vicinity of a dome apex. Thus the snap-in hooks protect the domelike filter screen in the axial direction, for instance when it strikes a wall of an inflow connection.

According to the invention, in an integrated valve assembly, an integral bore is embodied in a housing. At least one inflow connection discharges into this integral bore, and a housing cartridge of an integrated valve can be inserted into the bore. The filter screen is inserted into the pressure fluid flow path from the inflow connection to an inlet connection of the housing cartridge.

The integral bore of the integrated valve assembly has a radial shoulder, for instance, which is engaged from behind by the snap-in hooks of the filter screen. This makes a very firm seat of the filter screen in an axial direction possible.

Advantageously, the housing cartridge of the integrated valve, on an end portion, has an annular recess into which an axial portion of the supporting ring of the filter screen plunges with a flush fit, and as a result, the filter screen can easily be inserted along with the integrated valve into the integral bore.

The supporting ring, in an assembly position, can rest on its face end on a radial shoulder of the annular recess and is thus fixed in the axial direction of the integrated valve.

BRIEF DESCRIPTION OF THE DRAWINGS

A preferred exemplary embodiment of the invention will be described below in conjunction with schematic drawings, in which.

DESCRIPTION OF THE PREFERRED EMBODIMENT

Figure 1:
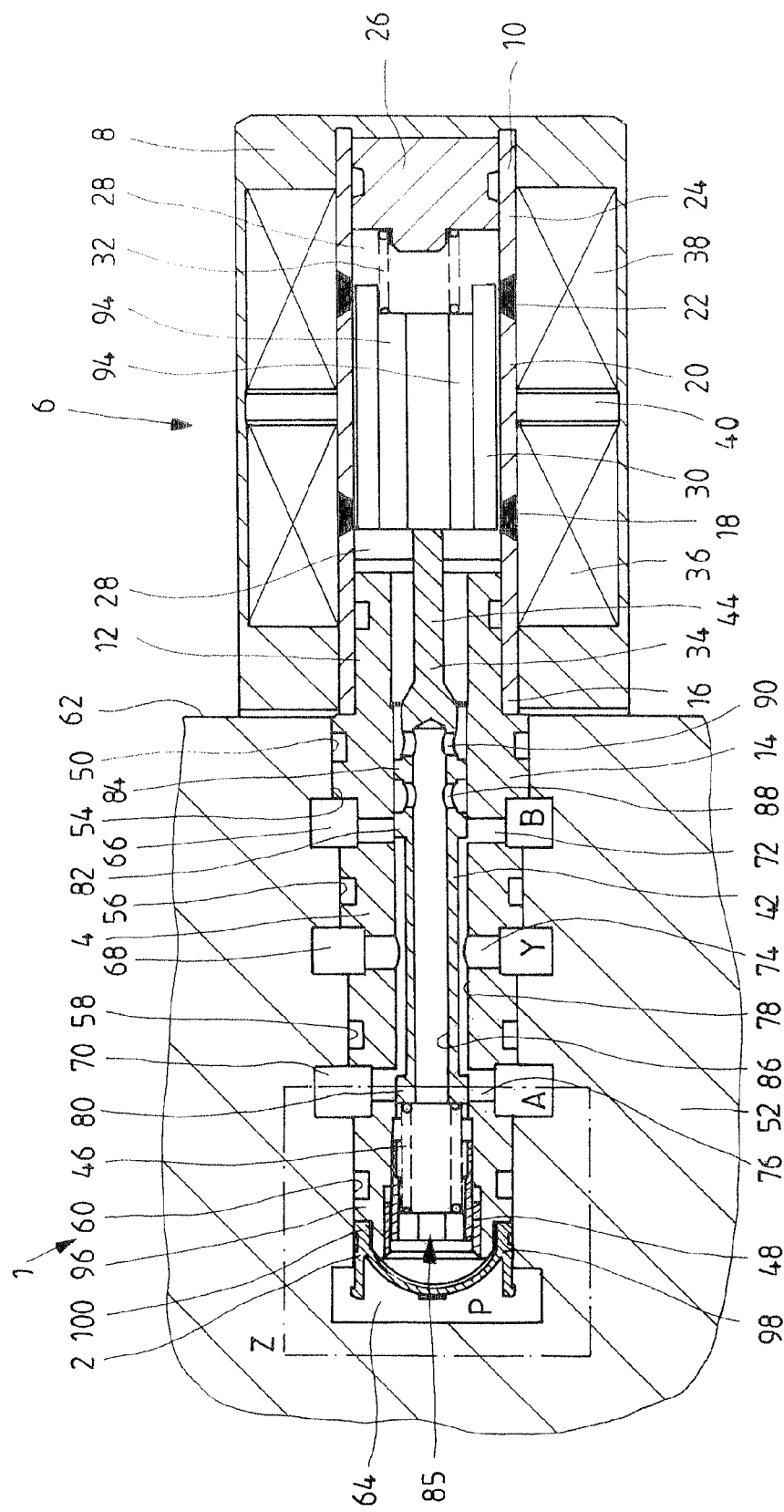
FIG. 1 shows an integrated valve assembly, in a sectional view, in an exemplary embodiment.

In FIG. 1, an integrated valve assembly 1 with a filter screen 2 of the invention is shown in a lateral sectional view in an exemplary embodiment. The integrated valve assembly 1 has a 4/3-way integrated multiposition valve 4, which is adjustable by means of a double-stroke magnet 6. The 4/3-way integrated multiposition valve 4 will hereinafter called an integrated valve 4. It is understood that the invention is not limited to that kind of integrated valve.

The double-stroke magnet 6 has a coil housing 8, with a pressure tube 10 that is placed on an end portion 12 of a housing cartridge 14 of the integrated valve 4. The pressure tube 10 is embodied in one piece and has an inner tubular portion 16, a first intermediate ring 18, a middle tubular portion 20, a second intermediate ring 22, and an outer tubular portion 24. While the two intermediate rings 18, 22 comprise nonmagnetic material, the other parts of the pressure tube 10 are made from magnetically conductive material. In the vicinity of the outer tubular portion 24, the pressure tube 10 is closed by a cylindrical outer yoke 26, as a result of which an inner chamber 28 that receives an armature 30 is defined in the pressure tube 10. The armature is acted upon, toward the outer yoke 26, via an armature spring 32, which is disposed between the outer yoke 26 and the armature 30, and toward the integrated valve 4, the armature rests on a tappet 34 of the integrated valve 4.

On the outer circumference of the pressure tube 10, a first coil 36 and a second coil 38 of the double-stroke magnet 6 are disposed one after the other in the coil housing 8; the coils 36, 38, located spatially close together, are separated from one another by an annular flux conducting disk 40. The mode of operation of a conventional double-stroke magnet 6 is well known and will therefore not be described in further detail here.

The integrated valve 4 actuated by the double-stroke magnet 6 is for instance a valve known per se, with four connections (P, A, B, Y) and three positions whose valve slide 42, acting as a final control element, is guided in the housing cartridge 14, and it rests on the armature 30 as a result of the tappet 34 embodied on an end portion 44 of the valve slide 42. In the center position, shown, the valve slide 42 is centered, via the armature 30 and the tappet 34, by a mechanical restoring device which has both a slide spring 46, braced on a spring bush 48 connected to the housing cartridge 14, and the armature spring 32.

The integrated valve 4 is inserted with the housing cartridge 14 into an integral bore or stepped bore 50 of a housing 52, which bore has a first through fourth bore step 54, 56, 58, 60. The first step 54 ends at a connection face 62 of the housing 52 for the double-stroke magnet 6 and the last step 60 ends in an unmachined inflow chamber 64 of the housing 62. Between respective adjacent steps, a respective annular chamber 66, 68, 70 is embodied in the housing 52. The annular chamber 70 on the left in FIG. 1 communicates with a work connection A; the middle annular chamber 68 with a tank connection Y; and the annular chamber 66 on the right communicates with a work connection B. The inflow chamber 64 is in communication with an inflow connection P.

Radial bore stars 72, 74, 76 of the housing cartridge 14, which extend from a valve bore 78 embodied in the housing cartridge 14, discharge into the annular chambers 66, 68, 70. The valve slide 42 is guided in the valve bore via three annular collars 80, 82, 84. The valve bore 78 is open toward the inflow chamber 64, via an axial inlet opening 85 of the housing cartridge 14 and of the spring bush 48.

The valve slide 42 has a blind bore 86, which is open toward the inflow chamber 64 via the inlet opening 85, and two transverse bores 88, 90, which intersect the blind bore 86. The transverse bore 90 disposed on the right in FIG. 1 creates a pressure fluid communication between the inflow chamber 64 and the inner chamber 28 of the double-stroke magnet 6. The face ends of the armature 30 are in pressure equilibrium via longitudinal armature bores 94 of the armature 30.

In its basic position shown in FIG. 1, the valve slide 42 of the integrated valve 4 blocks the pressure fluid communication between the inflow connection P and the two work connections A, B and opens the communication of the work connections A, B with the tank connection Y. Upon a displacement of the valve slide 42 out of the basic position in FIG. 1 to the right by means of the double-stroke magnet 6, the work connection A with the tank connection Y and with the work connection B is closed via the annular collar 80 and opened toward the inflow connection P. The communication between the tank connection Y and the work connection B remains open. If the valve slide 42 is displaced to the left from the basic position in FIG. 1, then the work connection B is opened toward the inflow connection P by the annular collar 82 and closed toward the tank connection Y and work connection A, while the work connection A continues to communicate with the tank connection Y.

The housing cartridge 14 of the integrated valve 4 is radially recessed in steps with an annular recess 98, in an end region 96 facing away from the double-stroke magnet 6. The filter screen 2 is inserted into this annular recess 98. The filter screen 2 will be described in further detail below in terms of a detail Z of the integrated valve assembly 1 in FIG. 2.

Figure 2:
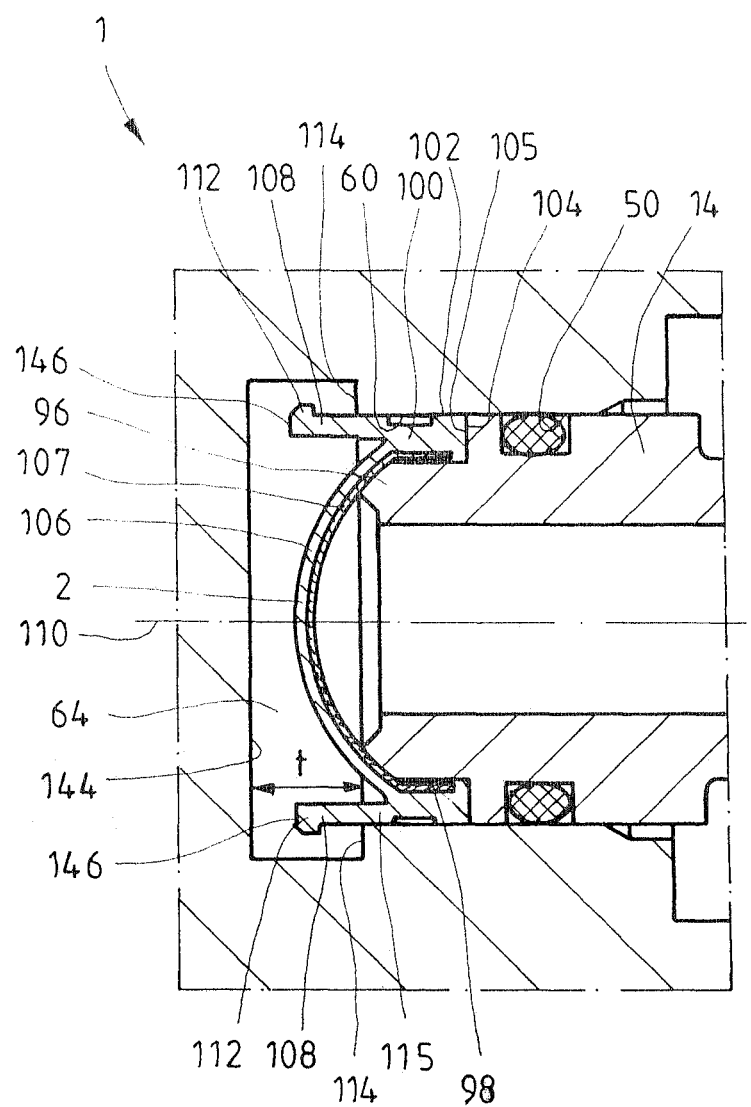
FIG. 2 shows a filter screen region Z of the integrated valve assembly of FIG. 1.

FIG. 2 shows the detail Z of FIG. 1 with the filter screen 2 of the integrated valve assembly 1 in an enlarged view. The housing cartridge 14 extends approximately to the inflow chamber 64, and the filter screen 2 is inserted flush with a supporting ring 100 into the annular recess 98. The filter screen 2 rests with an outer annular face 102 on the fourth bore step 60 of the stepped bore 50 and is braced on its face end with a supporting ring face 104 on an annular shoulder 105 of the annular recess 98. From the supporting ring 100, a filter dome 106 extends past the end region 96 of the housing cartridge 14 and protrudes in some portions into the vicinity of the inflow chamber 64. The filter dome 106 is located approximately on a chamfer portion 107 of the end region 96 of the housing cartridge 14.

From the supporting ring 100, snap-in hooks 108 also extend into the inflow chamber 64. The longitudinal axis of each of the snap-in hooks extends approximately axially parallel to the longitudinal axis 110 of the housing cartridge 14. The snap-in hooks 108, on their end toward the inflow chamber, have a hook lug 112, and these lugs engage a radial shoulder 114 of the stepped bore 50 from behind. In the end region 115, remote from the hook lug 112, of the snap-in hooks 108, these hooks are braced in some portions on the stepped bore 50. The filter screen 2 will be described in further detail in FIGS. 3a through 3c below.

Figure 3A:
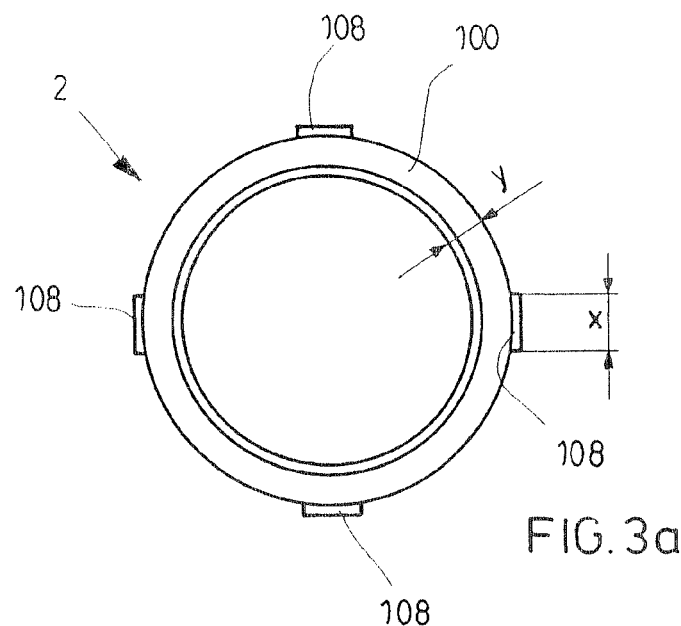
FIG. 3a shows a filter screen of FIG. 2 in a view from below.

In FIG. 3a, the filter screen 2 is shown in a view from below; in FIG. 3b, it is shown in a side view; and in FIG. 3c, it is shown in a top view. In FIG. 3a, it can be seen that four snap-in hooks 108 are distributed around the supporting ring 100, lying on a common pitch circle. The width x of the snap-in hooks 108 is approximately equivalent to the thickness y of the supporting ring 100. The axial length l of the snap-in hooks 108 in FIG. 3b is somewhat longer than the height h of the filter dome 106.

Figure 3B:
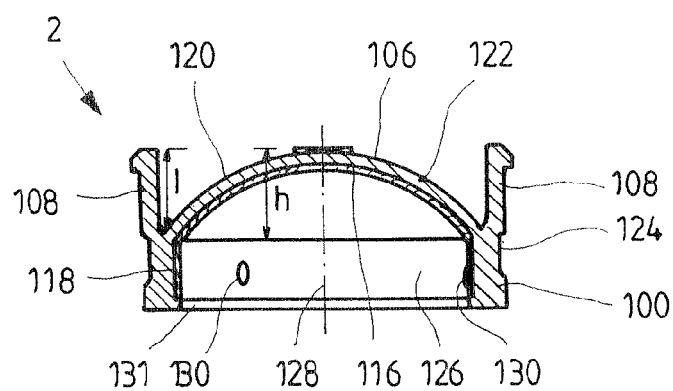
FIG. 3b shows the filter screen of FIG. 2 in a sectional view.
Figure 3C:
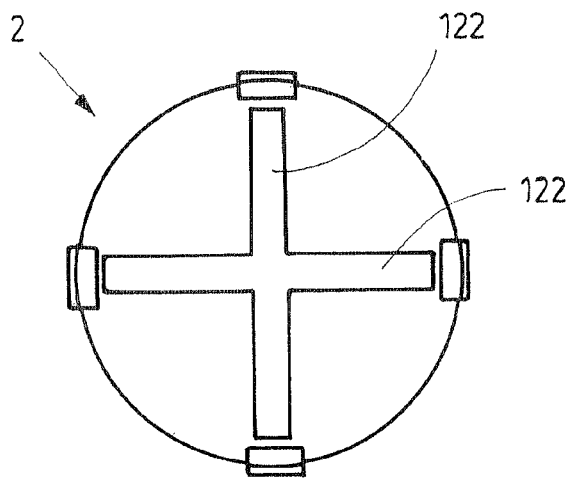
FIG. 3c shows the filter screen of FIG. 2 in a top view.

In FIG. 3b, the precise structure of the filter screen 2 can be seen. Accordingly, the filter screen has a filter cloth 116 with an annular portion 118 and a dome portion 120. The annular portion 118 is retained in the supporting ring 100 of the filter screen 2, and upon production, for instance by plastic injection molding, the supporting ring 100 is injected around the annular portion 118 of the filter cloth 116.

Struts 122, which extend on the outside along the dome portion 120 of the filter cloth 116, extend from the supporting ring 100. In FIG. 3c, the struts 122 are visible in the top view. They are disposed in a cross pattern and are somewhat narrower than the width x of the snap-in hooks 108 in FIG. 3a. Together with the supporting ring 100, the struts 122 fix the filter cloth 116 (see FIG. 3b).

On the supporting ring 100, below the snap-in hooks 108 in FIG. 3b, an outer circumferential groove 124 is embodied. On an inner circumferential wall 126 of the supporting ring 100, at least three elongated bumps 130 are integrally formed on, which extend axially parallel to the longitudinal axis 128 of the filter screen 2 and keep it in friction-locking fashion on the housing cartridge 14, in the annular recess 98 in FIG. 1. The bumps 130 are disposed approximately halfway up the height of the supporting ring 100. In what in FIG. 3b is the lower region of the supporting ring 100, the supporting ring is chamfered with an introduction chamfer 131 toward the inner circumferential wall 126. The bumps 130 are shown enlarged in FIGS. 4a and 4b and described in further detail below.

Figure 4A:
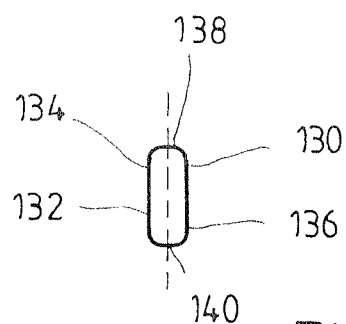
FIG. 4a shows a bump of the filter screen in a front view.
Figure 4B:
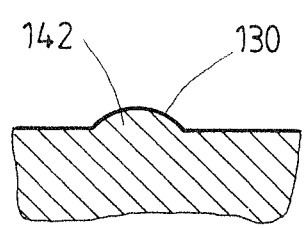
FIG. 4b shows the bump of the filter screen in a lateral sectional view.

FIG. 4a shows the bump 130 of FIG. 3b in a top view and FIG. 4b shows it in a cross-sectional view. The bump 130 of FIG. 4a has an elongated circumferential shape 132 with two long sides 134, 136 and two curved sides 138, 140. In FIG. 4b, the humplike cross-sectional face 142 of the bump 130 can be seen. The precise function of the bumps 130 will be described below.

The assembly and mode of operation of the filter screen 2 will now be described in further detail in conjunction with FIGS. 1 and 2. For the assembly, the filter screen 2 in FIG. 1 is placed onto the annular recess 98 of the housing cartridge 14, before the housing cartridge is inserted into the stepped bore 50. Because of the chamfer portion 107 of the housing cartridge 14 of FIG. 2 and the introduction chamfer 131 of the filter screen 2—see FIG. 3b—the filter screen can be centered easily on the housing cartridge 14. The bumps 130 and the supporting ring 100 of the filter screen 2 (see FIG. 3b) are elastically deformed in this placement operation and compensates for production tolerances of the filter screen 2 and housing cartridge 14; after the assembly of the filter screen 2, at maximum there may be a gap the size of one mesh width of the filter cloth 116 (see FIG. 3b), between the supporting ring 100 and the housing cartridge 14. As a result, dirt particles with a size that would be filtered by the filter cloth 116 cannot pass through this gap, either. Moreover, by means of the bumps 130 of the filter screen 2, the filter screen is fixed in friction-locking fashion on the annular recess 98, and the force required for attaching and detaching the filter screen 2 is relatively slight, because of the above-described gap and the bumps 130. The housing cartridge 14 is guided together with the filter screen 2 into the stepped bore 50. Upon insertion into the stepped bore 50, which is recessed toward the left in terms of FIG. 1, the snap-in hooks 108 are elastically prestressed radially inward in the direction of the longitudinal axis 110 of the housing cartridge 14. When the snap-in hooks 108 of the filter screen 2, at the end of the stepped bore 50, slide into the inflow chamber 64, they relax from the elastically prestressed position and snap into the inflow chamber 64, so that the hook lugs 112 engage the radial shoulder 114 of the stepped bore 50 from behind. Because of the outer circumferential groove 124—see FIG. 3b—of the filter screen 2, the filter screen rests on the stepped bore 50 only with the outer annular face 102—see FIG. 2—and can accordingly be introduced into the stepped bore with only slight friction.

If in maintenance of the integrated valve assembly 1, for instance, the integrated valve 4 is removed from the stepped bore 50, the filter screen 2 remains behind in its installed position, since it is retained by the snap-in hooks 108 and can no longer be pulled axially out of the stepped bore 50. If the filter screen 2 were removed with the integrated valve 4 from the stepped bore 50, then filtered dirt particles that have accumulated on the filter cloth 116 (see FIG. 3b) of the filter screen 2 could become detached from the filter screen and get into the annular chambers 66, 68, 70 of the housing 52 and contaminate them.

The axial displaceability of the filter screen 2 along the longitudinal axis 110 is limited on the one hand by contact of the hook lugs 112 with the radial shoulder 114 of the stepped bore 50, and on the other by a bottom face 144 of the inflow chamber 64—see FIG. 2—on which top faces 146 of the snap-in hooks 108 of the filter screen 2 can rest. The latter happens, for instance upon reinstallation of the integrated valve 4, if the filter screen 2 does not slide into the annular recess 98 in FIG. 2 but instead is axially displaced by the integrated valve 4. If the top faces 146 rest on the bottom face 144 of the inflow chamber 64, then the filter screen 2 continues to perform its full function, since the length l of the snap-in hooks 108 of FIG. 3b is approximately equivalent to the depth t of the inflow chamber 64 of FIG. 2, and thus the supporting ring 100 continues to be located in the stepped 50.

In FIG. 1, pressure fluid can flow in the integrated valve assembly 1 from the inflow connection P to the connections A and B via the filter screen 2. The filter screen 2 is curved counter to the flow direction, as a result of which dirt particles essentially slide along the dome portion 120 of the filter cloth 116—see FIG. 3b—and accumulate in the vicinity of the outer diameter of the filter screen 2. Thus soiling of the filter cloth 116 can be kept to a minimum, and the flow resistance remains as constant as possible for the duration of use of the filter screen 2.

A filter screen for an integrated valve is disclosed, which is inserted into an integral bore of a housing. The filter screen has a retention protrusion, which upon insertion can be put from an assembly position into a retention position and engages an inflow chamber of a housing.

The foregoing relates to the preferred exemplary embodiment of the invention, it being understood that other variants and embodiments thereof are possible within the spirit and scope of the invention, the latter being defined by the appended claims.

The invention claimed is:

1. An integrated valve assembly having an integral bore, embodied in a housing, in which bore at least one inflow connection is embodied and into which bore a housing cartridge of an integrated valve is inserted,
    wherein, a filter screen is inserted into a flow path of pressure fluid from the inflow connection to an inlet opening of the housing cartridge,
    wherein the filter screen has a retention protrusion, which upon insertion of the integrated valve, is movable from an assembly position into a retention position by elastic deformation of the retention protrusion,
    wherein the retention protrusion includes a plurality of snap-in hooks, and
    wherein the filter screen has a domelike filter dome, and the snap-in hooks end, viewed in an axial direction, approximately in the vicinity of a dome apex.

2. The integrated valve assembly as defined by claim 1, wherein the housing cartridge, on an end region, has an annular recess into which a supporting ring of the filter screen plunges with a flush fit.

3. The integrated valve assembly as defined by claim 2, wherein the supporting ring, in the assembly position, rests on its face end on an annular shoulder of the annular recess.

4. The integrated valve assembly as defined by claim 1, wherein the plurality of snap-in hooks of the retention protrusion includes at least three snap-in hooks distributed uniformly over a circumference of the filter screen.

5. The integrated valve assembly as defined by claim 4, wherein the at least three snap-in hooks extend approximately axially parallel away from a supporting ring of the filter screen.

6. The integrated valve assembly as defined by claim 5, wherein the supporting ring supports a filter cloth.

7. The integrated valve assembly as defined by claim 1, wherein the filter screen includes a supporting ring having an inner circumferential wall on which bumps are embodied, and the bumps are configured to be put in friction- or form-locking fashion into contact with an outer circumferential portion of the integrated valve.

8. An integrated valve assembly, having an integral bore, embodied in a housing, in which bore at least one inflow connection is embodied and into which bore a housing cartridge of an integrated valve is inserted, wherein, a filter screen is inserted into a flow path of pressure fluid from the inflow connection to an inlet opening of the housing cartridge, wherein the filter screen has a retention protrusion, which upon insertion of the integrated valve, is movable from an assembly position into a retention position by elastic deformation of the retention protrusion, wherein the retention protrusion includes a plurality of snap-in hooks, and wherein the integral bore has a radial shoulder, which is engaged from behind by the snap-in hooks of the filter screen.

9. The integrated valve assembly as defined by claim 8, wherein the housing cartridge, on an end region, has an annular recess into which a supporting ring of the filter screen plunges with a flush fit.

10. The integrated valve assembly as defined by claim 9, wherein the supporting ring, in the assembly position, rests on its face end on an annular shoulder of the annular recess.

11. The integrated valve assembly as defined by claim 8, wherein the plurality of snap-in hooks of the retention protrusion includes at least three snap-in hooks distributed uniformly over a circumference of the filter screen.

12. The integrated valve assembly as defined by claim 11, wherein the at least three snap-in hooks extend approximately axially parallel away from a supporting ring of the filter screen.

13. The integrated valve assembly as defined by claim 12, wherein the supporting ring supports a filter cloth.

14. The integrated valve assembly as defined by claim 8, wherein the filter screen includes a supporting ring having an inner circumferential wall on which bumps are embodied, and the bumps are configured to be put in friction- or form-locking fashion into contact with an outer circumferential portion of the integrated valve.

15. The integrated valve assembly as defined by claim 8, wherein the filter screen has a domelike filter dome, and the plurality of snap-in hooks end, viewed in an axial direction, approximately in the vicinity of a dome apex.

\* \* \* \* \*